US012094222B2

(12) United States Patent
Lin

(10) Patent No.: US 12,094,222 B2
(45) Date of Patent: Sep. 17, 2024

(54) CABIN MONITORING AND SITUATION UNDERSTANDING PERCEIVING METHOD AND SYSTEM THEREOF

(71) Applicant: Automotive Research & Testing Center, Changhua County (TW)

(72) Inventor: Yi-Jie Lin, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 378 days.

(21) Appl. No.: 17/457,030

(22) Filed: Nov. 30, 2021

(65) Prior Publication Data

US 2023/0169782 A1 Jun. 1, 2023

(51) Int. Cl.
*G06V 20/00* (2022.01)
*B60W 40/08* (2012.01)
(Continued)

(52) U.S. Cl.
CPC ............ *G06V 20/59* (2022.01); *B60W 40/08* (2013.01); *G06N 3/04* (2013.01); *G06N 3/08* (2013.01);
(Continued)

(58) Field of Classification Search
CPC ........ G06V 20/59; G06V 10/60; G06V 10/80; G06V 10/82; G06V 20/58; G06V 40/165;
(Continued)

(56) References Cited

U.S. PATENT DOCUMENTS

2017/0232975 A1   8/2017 Burk
2017/0274906 A1   9/2017 Hassan et al.
(Continued)

FOREIGN PATENT DOCUMENTS

TW           202037511 A    10/2020

OTHER PUBLICATIONS

Rong et al Artificial Intelligence Methods in In-Cabin Use Cases: A Survey, IEEE Intelligent Transportation Systems Magazine, vol. 14, No. 3, (Year: 2021).*
(Continued)

*Primary Examiner* — Ping Y Hsieh
*Assistant Examiner* — Xiao Liu
(74) *Attorney, Agent, or Firm* — CKC & Partners Co., LLC

(57) ABSTRACT

A cabin monitoring and situation understanding perceiving method is proposed. A cabin interior image capturing step is performed to capture a cabin interior image. A generative adversarial network model creating step is performed to create a generative adversarial network model according to the cabin interior image. An image adjusting step is performed to adjust the cabin interior image to generate an approximate image. A cabin interior monitoring step is performed to process the approximate image to generate a facial recognizing result and a human pose estimating result. A cabin exterior image and voice capturing step is performed to capture a cabin exterior image and a voice information. A situation understanding perceiving step is performed to process at least one of the approximate image, the cabin exterior image and the voice information according to a situation understanding model to perceive a situation understanding result.

19 Claims, 7 Drawing Sheets

(51) Int. Cl.
G06N 3/04 (2023.01)
G06N 3/08 (2023.01)
G06T 7/70 (2017.01)
G06V 10/60 (2022.01)
G06V 10/80 (2022.01)
G06V 10/82 (2022.01)
G06V 20/58 (2022.01)
G06V 20/59 (2022.01)
G06V 40/16 (2022.01)
G06V 40/20 (2022.01)

(52) U.S. Cl.
CPC ............... *G06T 7/70* (2017.01); *G06V 10/60* (2022.01); *G06V 10/80* (2022.01); *G06V 10/82* (2022.01); *G06V 20/58* (2022.01); *G06V 40/165* (2022.01); *G06V 40/171* (2022.01); *G06V 40/172* (2022.01); *G06V 40/20* (2022.01); *B60W 2040/089* (2013.01); *B60W 2540/21* (2020.02); *G06T 2207/10144* (2013.01); *G06T 2207/10152* (2013.01); *G06T 2207/20081* (2013.01); *G06T 2207/20084* (2013.01); *G06T 2207/20221* (2013.01); *G06T 2207/30201* (2013.01); *G06T 2207/30268* (2013.01)

(58) Field of Classification Search
CPC .... G06V 40/171; G06V 40/172; G06V 40/20; G06V 10/454; G06V 20/56; G06V 20/597; G06V 10/764; B60W 40/08; B60W 2040/089; B60W 2540/21; G06N 3/04; G06N 3/08; G06N 3/0442; G06N 3/045; G06N 3/0464; G06N 3/0475; G06N 3/094; G06T 7/70; G06T 2207/10144; G06T 2207/10152; G06T 2207/20081; G06T 2207/20084; G06T 2207/20221; G06T 2207/30201; G06T 2207/30268

See application file for complete search history.

(56) References Cited

U.S. PATENT DOCUMENTS

2020/0237266 A1 7/2020 Qiao et al.
2021/0109956 A1 4/2021 Su et al.

OTHER PUBLICATIONS

Stappen et al,Domain Adaptation with Joint Learning for Generic, Optical Car Part Recognition and Detection Systems (Go-CaRD) arXiv:2006.08521v2 Feb. 15 (Year: 2021).*

Steffens et al, Deep Learning based Exposure Correction for Image Exposure Correction with Application in Computer Vision for Robotics, Latin American Robotic Symposium, Workshop on Robotics in Education (WRE), pp. 194-200 (Year: 2018).*

* cited by examiner

CABIN MONITORING AND SITUATION UNDERSTANDING PERCEIVING METHOD AND SYSTEM THEREOF

BACKGROUND

Technical Field

The present disclosure relates to a cabin monitoring and situation understanding perceiving method and a system thereof. More particularly, the present disclosure relates to a cabin monitoring and situation understanding perceiving method and a system thereof that can monitor inside and outside a vehicle cabin and the behavior of people inside the vehicle cabin, and have active human-machine interaction between the vehicle and people inside the vehicle cabin.

Description of Related Art

With the vigorous development of economy and technology, vehicles passing through cities and roads also grow. However, people are affected by life pressure and mental stress, which can easily cause fatigue driving, driving inattention and abnormal behavior of passengers, and even encounter emergencies outside a vehicle cabin. Hence, monitoring inside and outside the vehicle cabin and perceiving the vehicle environment can greatly improve the safety of the vehicle during driving.

In recent years, Driver Monitoring System (DMS) and Visual Question Answering (VQA) applied to vehicles are changing rapidly, but the monitoring range of DMS is quite limited, and the current trend of the vehicle market is mainly focused on the realization of the monitoring capability under Wide-Field of View (WFoV). On the other hand, the conventional VQA still lacks vehicle-to-person active human-machine interaction.

In addition, DMS based on visual information usually uses machine vision technology or sensors to detect the facial features and sight directions of a driver to determine the mental state of the driver, but the conventional driving monitoring method is easily affected by the cabin environment and the camera angle during the detecting process. For instance, evaluation in dim light is likely to cause misjudgment of driving monitoring, which reduces the validity and accuracy of detection results.

In view of the problems of the conventional DMS and VQA, how to establish a cabin monitoring and situation understanding perceiving method and a system thereof that can effectively monitor the driver and passengers in the vehicle cabin and simultaneously carry out vehicle-to-person active human-machine interaction are indeed highly anticipated by the public and become the goal and the direction of relevant industry efforts.

SUMMARY

According to one aspect of the present disclosure, a cabin monitoring and situation understanding perceiving method is configured to monitor an inside vehicle cabin and perceive a situation understanding result. The cabin monitoring and situation understanding perceiving method includes a cabin interior image capturing step, a generative adversarial network model creating step, an image adjusting step, a cabin interior monitoring step, a cabin exterior image and voice capturing step and a situation understanding perceiving step. The cabin interior image capturing step is performed to drive a first camera unit to capture a cabin interior image from the inside vehicle cabin and store the cabin interior image to a storage unit. The cabin interior image includes an overexposed image, a normally exposed image and an underexposed image. The generative adversarial network model creating step is performed to drive a processing unit to create a generative adversarial network model according to the overexposed image, the normally exposed image and the underexposed image of the cabin interior image from the storage unit. The image adjusting step is performed to drive the processing unit to adjust the cabin interior image according to the generative adversarial network model to generate an approximate image approximating the normally exposed image. The cabin interior monitoring step is performed to drive the processing unit to process the approximate image according to a facial recognizing model and a human pose estimating model to generate a facial recognizing result and a human pose estimating result. The cabin exterior image and voice capturing step is performed to drive a second camera unit to capture a cabin exterior image and store the cabin exterior image to the storage unit, and drive an audio unit to capture a voice information from the inside vehicle cabin and store the voice information to the storage unit. The situation understanding perceiving step is performed to drive the processing unit to process at least one of the approximate image, the cabin exterior image and the voice information according to a situation understanding model to perceive the situation understanding result.

According to another aspect of the present disclosure, a cabin monitoring and situation understanding perceiving method is configured to monitor an inside vehicle cabin and perceive a situation understanding result. The cabin monitoring and situation understanding perceiving method includes a cabin interior image capturing step, an image adjusting step, a cabin interior monitoring step, a cabin exterior image and voice capturing step, a situation understanding model creating step and a situation understanding perceiving step. The cabin interior image capturing step is performed to drive a first camera unit to capture a cabin interior image from the inside vehicle cabin and store the cabin interior image to a storage unit. The image adjusting step is performed to drive a processing unit to adjust the cabin interior image in the storage unit according to a generative adversarial network model to generate an approximate image. The cabin interior monitoring step is performed to drive the processing unit to process the approximate image according to a facial recognizing model and a human pose estimating model to generate a facial recognizing result and a human pose estimating result. The cabin exterior image and voice capturing step is performed to drive a second camera unit to capture a cabin exterior image and store the cabin exterior image to the storage unit, and drive an audio unit to capture a voice information from the inside vehicle cabin and store the voice information to the storage unit. The situation understanding model creating step is performed to drive the processing unit to train the approximate image, the cabin exterior image and the voice information to create a situation understanding model. The situation understanding perceiving step is performed to drive the processing unit to process at least one of the approximate image, the cabin exterior image and the voice information according to the situation understanding model to perceive the situation understanding result.

According to yet another aspect of the present disclosure, a cabin monitoring and situation understanding perceiving system is configured to monitor an inside vehicle cabin and perceive a situation understanding result. The cabin monitoring and situation understanding perceiving system includes a storage unit, a first camera unit, a second camera unit, an audio unit and a processing unit. The storage unit is configured to access a generative adversarial network model, a facial recognizing model, a human pose estimating model and a situation understanding model. The first camera unit is connected to the storage unit. The first camera unit captures a cabin interior image from the inside vehicle cabin and stores the cabin interior image to the storage unit. The second camera unit is connected to the storage unit. The second camera unit captures a cabin exterior image and stores the cabin exterior image to the storage unit. The audio unit is connected to the storage unit. The audio unit captures a voice information from the inside vehicle cabin and stores the voice information to the storage unit. The processing unit is connected to the storage unit and configured to implement a cabin monitoring and situation understanding perceiving method including performing an image adjusting step, a cabin interior monitoring step and a situation understanding perceiving step. The image adjusting step is performed to adjust the cabin interior image according to the generative adversarial network model to generate an approximate image. The cabin interior monitoring step is performed to process the approximate image according to the facial recognizing model and the human pose estimating model to generate a facial recognizing result and a human pose estimating result. The situation understanding perceiving step is performed to process at least one of the approximate image, the cabin exterior image and the voice information according to the situation understanding model to perceive the situation understanding result.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
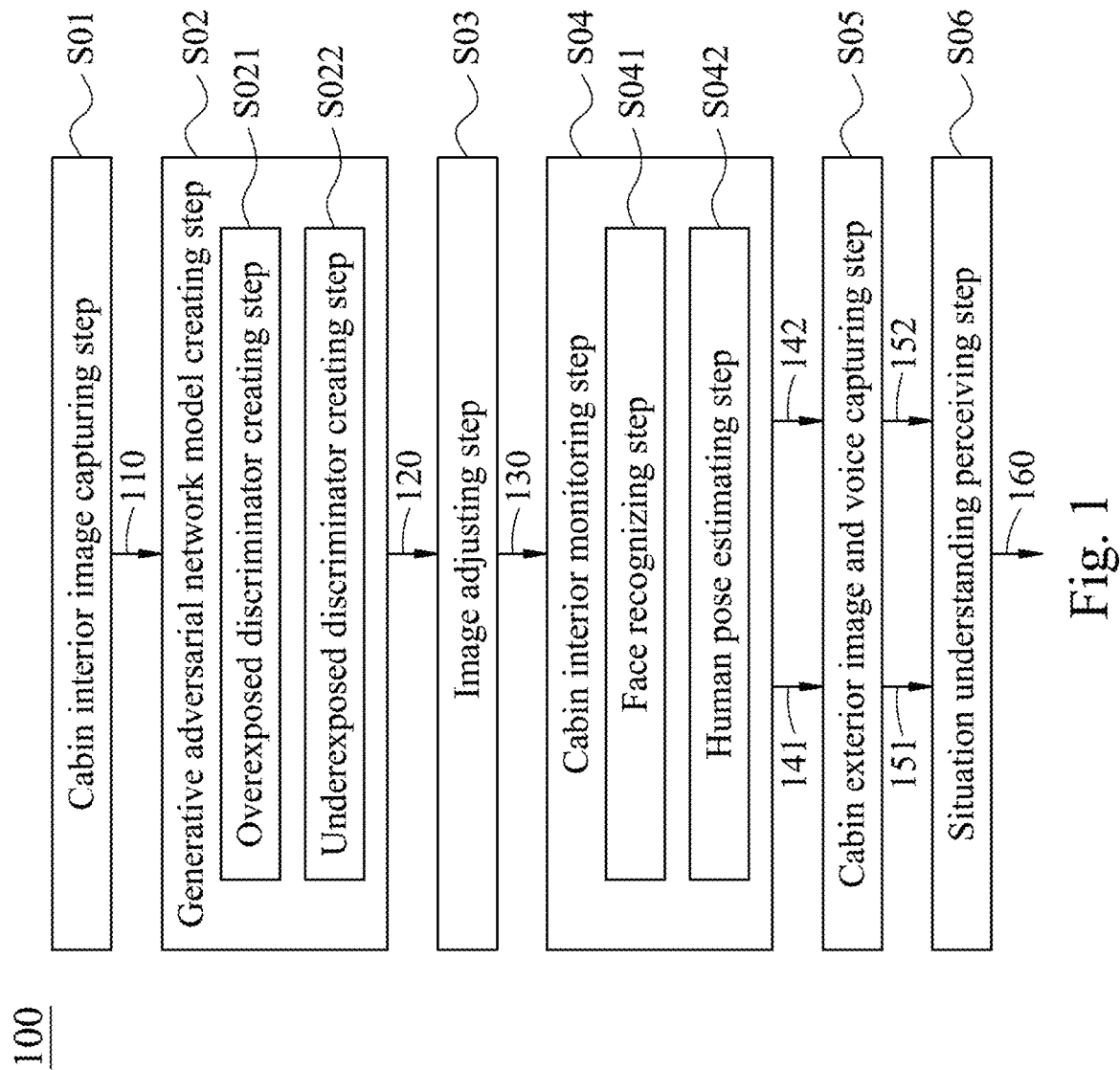
FIG. 1 shows a flow chart of a cabin monitoring and situation understanding perceiving method according to a first embodiment of the present disclosure.

Please refer to FIG. 1. FIG. 1 shows a flow chart of a cabin monitoring and situation understanding perceiving method 100 according to a first embodiment of the present disclosure. The cabin monitoring and situation understanding perceiving method 100 is configured to monitor an inside vehicle cabin and perceive a situation understanding result 160, and includes a cabin interior image capturing step S01, a generative adversarial network model creating step S02, an image adjusting step S03, a cabin interior monitoring step S04, a cabin exterior image and voice capturing step S05 and a situation understanding perceiving step S06.

The cabin interior image capturing step S01 is performed to drive a first camera unit to capture a cabin interior image 110 from the inside vehicle cabin and store the cabin interior image 110 to a storage unit. In particular, the first camera unit can be a camera used by an Occupancy Monitoring System (OMS), but the present disclosure is not limited thereto. The camera used by the conventional Driver Monitoring System (DMS) is usually set on the steering wheel in the vehicle to shoot or capture a current image of a driver; instead, the first camera unit of the present disclosure is arranged on a rearview mirror in the inside vehicle cabin, hence the present disclosure achieves a full-scale surveillance of the inside vehicle cabin by changing the position of the first camera unit.

Further, the cabin interior image 110 includes an overexposed image, a normally exposed image and an underexposed image. In detail, in response to determining that an exposure value of the cabin interior image 110 is greater than or equal to −1.5 and less than −1, the cabin interior image 110 is the overexposed image; in response to determining that the exposure value of the cabin interior image 110 is greater than or equal to −1 and less than 1, the cabin interior image 110 is the normally exposed image; and in response to determining that the exposure value of the cabin interior image 110 is greater than or equal to 1 and less than 1.5, the cabin interior image 110 is the underexposed image.

The generative adversarial network model creating step S02 is performed to drive a processing unit to create a Generative Adversarial Network (GAN) model 120 according to the overexposed image, the normally exposed image and the underexposed image of the cabin interior image 110 from the storage unit.

The image adjusting step S03 is performed to drive the processing unit to adjust the cabin interior image 110 according to the generative adversarial network model 120 to generate an approximate image 130 approximating the normally exposed image. In short, the cabin interior image 110 is adjusted to the approximate image 130, and an exposure value of the approximate image 130 is greater than or equal to −1 and less than 1.

The cabin interior monitoring step S04 is performed to drive the processing unit to process the approximate image 130 according to a facial recognizing model and a human pose estimating model to generate a facial recognizing result 141 and a human pose estimating result 142.

The cabin exterior image and voice capturing step S05 is performed to drive a second camera unit to capture a cabin exterior image 151 and store the cabin exterior image 151 to the storage unit, and drive an audio unit to capture a voice information 152 from the inside vehicle cabin and store the voice information 152 to the storage unit. In particular, the second camera unit can be a camera used by an Advanced Driver Assistance System (ADAS) of an autonomous vehicle, but the present disclosure is not limited thereto. Therefore, the cabin monitoring and situation understanding perceiving method 100 of the present disclosure uses the second camera unit to capture the cabin exterior image 151 to understand the situation of the outside vehicle cabin.

The situation understanding perceiving step S06 is performed to drive the processing unit to process at least one of the approximate image 130, the cabin exterior image 151 and the voice information 152 according to a situation understanding model to perceive the situation understanding result 160. It should be noted that the situation understanding model is created by the processing unit by performing feature learning on the approximate image 130, the cabin exterior image 151 and the voice information 152 in advance. Therefore, the approximate image 130, the cabin exterior image 151 and the voice information 152 of the driver or a passenger can be imported into the situation understanding model, so that the situation understanding result 160 can be used to realize an active human-machine interaction between the vehicle and the driver or the passenger.

Therefore, the cabin monitoring and situation understanding perceiving method 100 of the present disclosure creates the generative adversarial network model 120 according to the overexposed image, the normally exposed image and the underexposed image so as to adjust the cabin interior image 110 to the normal exposure value, thereby ensuring that the situation understanding result 160 perceived subsequently has a high accuracy rate. The operating mechanisms of the generative adversarial network model creating step S02, the image adjusting step S03 and the cabin interior monitoring step S04 of the present disclosure are described in more detail with the drawings and the embodiments below.

Figure 2:
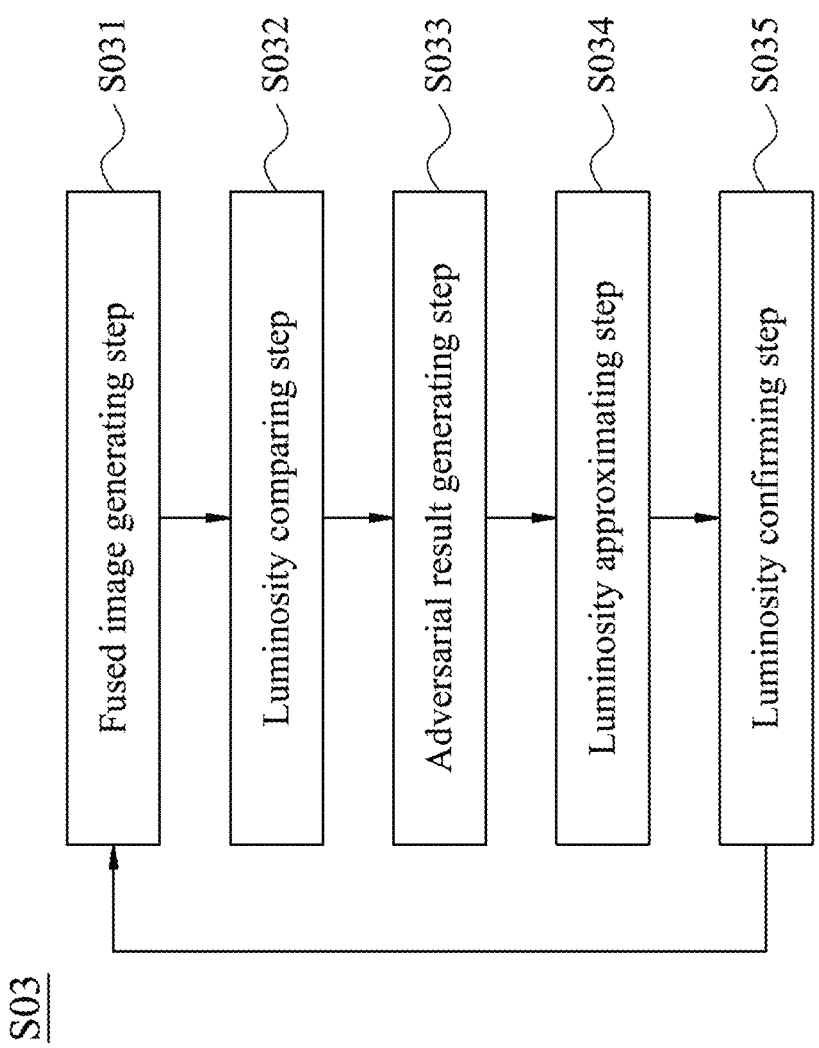
FIG. 2 shows a flow chart of an image adjusting step of the cabin monitoring and situation understanding perceiving method of FIG. 1.
Figure 3:
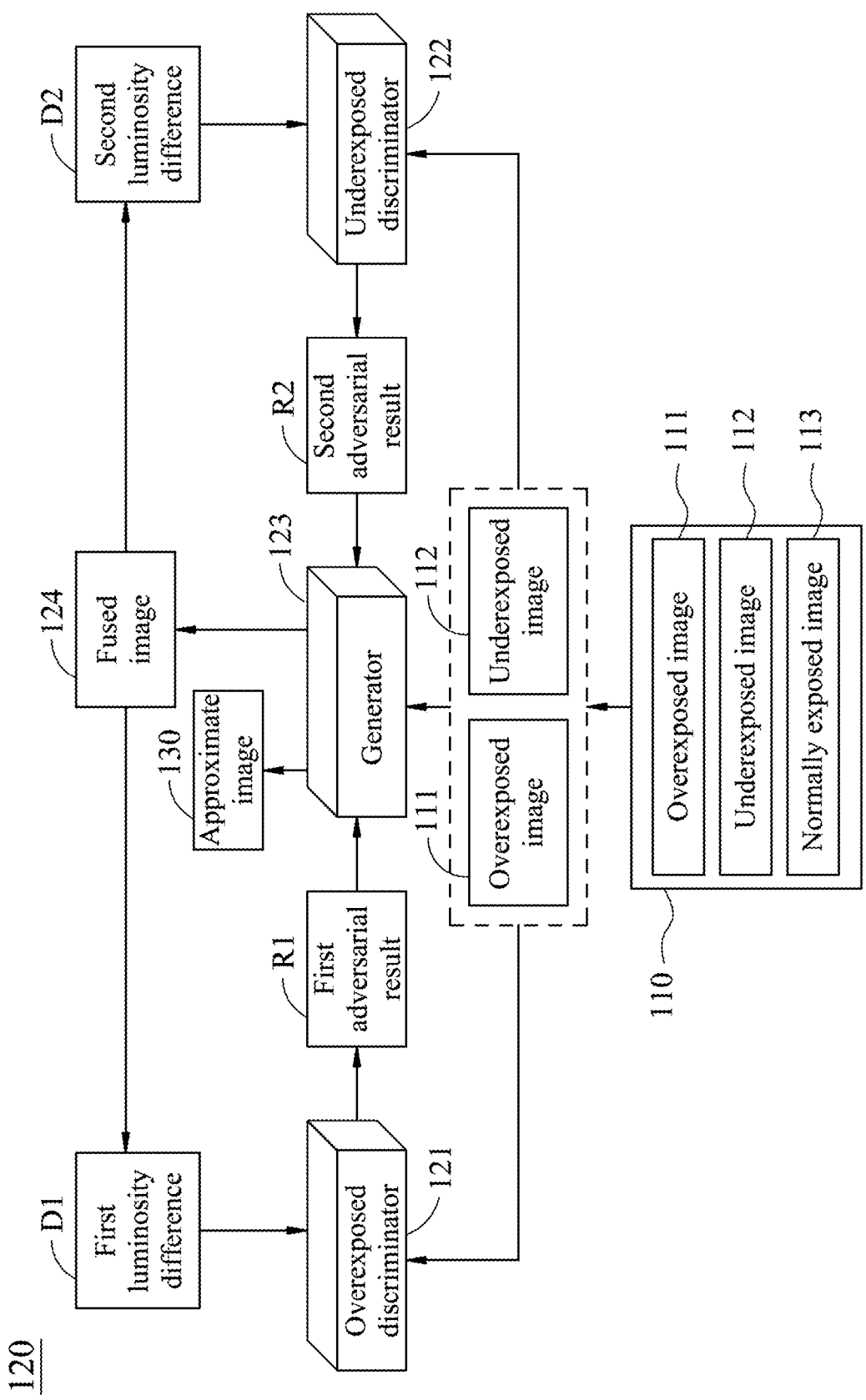
FIG. 3 shows a schematic view of a generative adversarial network model of the cabin monitoring and situation understanding perceiving method of FIG. 1.

Please refer to FIG. 1, FIG. 2 and FIG. 3. FIG. 2 shows a flow chart of the image adjusting step S03 of the cabin monitoring and situation understanding perceiving method 100 of FIG. 1. FIG. 3 shows a schematic view of the generative adversarial network model 120 of the cabin monitoring and situation understanding perceiving method 100 of FIG. 1. As shown in FIG. 1 and FIG. 3, the generative adversarial network model creating step S02 can include an overexposed discriminator creating step S021 and an underexposed discriminator creating step S022. The overexposed discriminator creating step S021 is performed to drive the processing unit to create an overexposed discriminator 121 according to the overexposed image 111 of the cabin interior image 110. The underexposed discriminator creating step S022 is performed to drive the processing unit to create an underexposed discriminator 122 according to the underexposed image 112 of the cabin interior image 110. It should be noted that the generative adversarial network model 120 is composed of a generator 123, the overexposed discriminator 121 and the underexposed discriminator 122. The generator 123 is configured to perform an image conversion and performs GAN learning together with the overexposed discriminator 121 and the underexposed discriminator 122 to update parameters.

In FIG. 1 to FIG. 3, the image adjusting step S03 can include a fused image generating step S031, a luminosity comparing step S032, an adversarial result generating step S033 and a luminosity approximating step S034.

The fused image generating step S031 is performed to drive the processing unit to input the overexposed image 111 and the underexposed image 112 to the generator 123, and then the generator 123 processes the overexposed image 111 and the underexposed image 112 through an internal model to generate a fused image 124.

The luminosity comparing step S032 is performed to drive the processing unit to compare the fused image 124 with the underexposed image 112 to generate a first luminosity difference D1 and input the first luminosity difference D1 to the overexposed discriminator 121. The luminosity comparing step S032 is performed to drive the processing unit to compare the fused image 124 with the overexposed image 111 to generate a second luminosity difference D2 and input the second luminosity difference D2 to the underexposed discriminator 122.

The adversarial result generating step S033 is performed to drive the overexposed discriminator 121 to output a first adversarial result R1 to the generator 123 according to the first luminosity difference D1 and the overexposed image 111. The adversarial result generating step S033 is performed to drive the underexposed discriminator 122 to output a second adversarial result R2 to the generator 123 according to the second luminosity difference D2 and the underexposed image 112. In detail, regarding the part of the overexposed discriminator 121, the present disclosure inputs a luminosity difference between the underexposed image 112 and the fused image 124 (i.e., the first luminosity difference D1) together with the overexposed image 111 to the overexposed discriminator 121, and uses the overexposed image 111 as a standard for modeling. The model returns an adversarial result generated during modeling (i.e., the first adversarial result R1) to the generator 123. Similarly, regarding the part of the underexposed discriminator 122, the present disclosure inputs a luminosity difference between the overexposed image 111 and the fused image 124 (i.e., the second luminosity difference D2) together with the underexposed image 112 to the underexposed discriminator 122, and uses the underexposed image 112 as a standard for modeling. The model returns an adversarial result generated during modeling (i.e., the second adversarial result R2) to the generator 123.

The luminosity approximating step S034 is performed to drive the generator 123 to adjust the cabin interior image 110 according to the first adversarial result R1 and the second adversarial result R2 to generate the approximate image 130 approximating the normally exposed image 113. In particular, the generator 123 adjusts the underexposed image 112 of the cabin interior image 110 according to the first adversarial result R1 to generate an image similar to the overexposed image 111; or, the generator 123 adjusts the overexposed image 111 of the cabin interior image 110 according to the second adversarial result R2 to generate an image similar to the underexposed image 112. Therefore, the present disclosure generates the first adversarial result R1 and the second adversarial result R2 through performing a gap approximation on the fused image 124 to the overexposed image 111 and the underexposed image 112, and then uses the first adversarial result R1 and the second adversarial result R2 to adjust the cabin interior image 110 to the approximate image 130.

It is worth explaining that the storage unit of the present disclosure accesses an allowable value. The image adjusting step S03 can further include a luminosity confirming step S035. The luminosity confirming step S035 is performed to drive the processing unit to perform an evaluation operating procedure on the approximate image 130 and the normally exposed image 113. The evaluation operating procedure confirms whether a luminosity difference between the approximate image 130 and the normally exposed image 113 is within the allowable value. Accordingly, in response to determining that the luminosity difference is within the allowable value, the processing unit successively performs the cabin interior monitoring step S04. On the other hand, in response to determining that the luminosity difference is not within the allowable value, the processing unit updates the generator 123 according to the first adversarial result R1 and the second adversarial result R2. Therefore, after the fused image 124 generated by the generator 123 having been updated performs the gap approximation again, the approximate image 130 gets closer and closer to the normally exposed image 113.

As shown in FIG. 1, the cabin interior monitoring step S04 can include a face recognizing step S041 and a human pose estimating step S042. The face recognizing step S041 is performed to drive the processing unit to extract a plurality of facial landmarks and a plurality of head angle points from the approximate image 130 according to the facial recognizing model, and calculate the facial landmarks and the head angle points to generate the facial recognizing result 141. The human pose estimating step S042 is performed to drive the processing unit to estimate a human skeleton from the approximate image 130 according to the human pose estimating model and calculate the human skeleton to generate the human pose estimating result 142.

In detail, the facial recognizing model can be trained by integrating a FaceNet algorithm and a Head Pose Estimation algorithm, but the present disclosure is not limited thereto. The FaceNet algorithm is a face recognizing network that extracts the facial landmarks from the approximate image 130 and performs a face recognition on the human face area. On the other hand, the Head Pose Estimation algorithm extracts the head angle points from the approximate image 130 and estimates a head posture of the human head. If the facial landmarks and the head angle points in the approximate image 130 are not completely extracted, the processing unit will re-execute the cabin interior monitoring step S04 until the number of the facial landmarks and the head angle points available for generating the facial recognizing result 141 is sufficient. Therefore, the cabin monitoring and situation understanding perceiving method 100 of the present disclosure uses the facial recognizing model to perform the facial recognition and the head pose estimation on the driver or a passenger in the approximate image 130 to generate the facial recognizing result 141 so as to achieve driving fatigue detection, behavior analysis or emotional control.

In addition, the human pose estimating model can be obtained by integrating an object detecting algorithm (i.e., You Only Look Once (YOLO)) and a human pose estimating algorithm (i.e., OpenPose), but the present disclosure is not limited thereto. YOLO is One-stage Object Detection, that is, YOLO only needs to perform Convolutional Neural Network (CNN) on an image once to determine the location and category of the object in the image. OpenPose is an algorithm for estimating 2D pose of multiple people, and uses the architecture of CNN to find a confidence map of each of the joint point positions and a Part Affinity Fields (PAF) newly defined by OpenPose. After OpenPose integrates the above two features, OpenPose can further predict each of the limb segments. Hence, OpenPose can still maintain the high predicting accuracy and processing speed of human joints and the limb segments in the multi-person and cluttered environment. Therefore, the cabin monitoring and situation understanding perceiving method 100 of the present disclosure uses the human pose estimating model to perform the object detection and the human pose estimation on an object, the driver or passenger in the approximate image 130 to generate the human pose estimating result 142 so as to achieve cabin monitoring.

Figure 4:
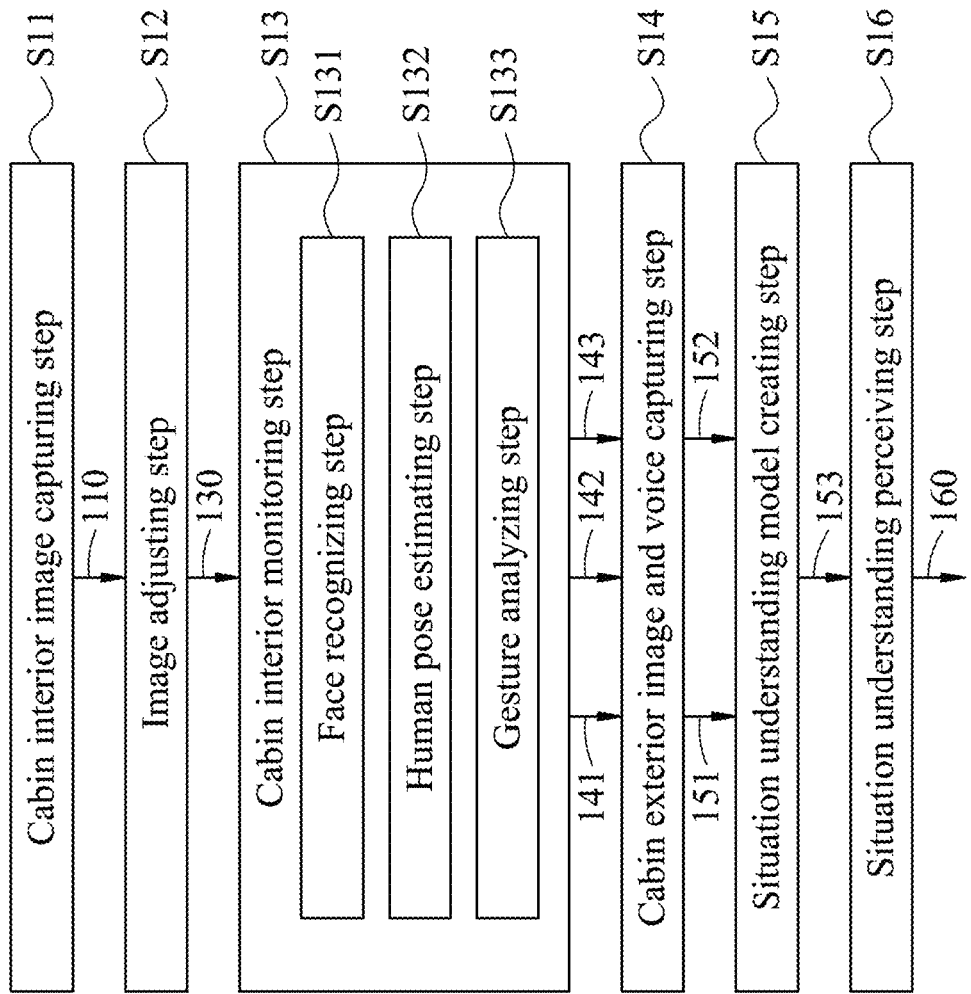
FIG. 4 shows a flow chart of a cabin monitoring and situation understanding perceiving method according to a second embodiment of the present disclosure.

Please refer to FIG. 4. FIG. 4 shows a flow chart of a cabin monitoring and situation understanding perceiving method 200 according to a second embodiment of the present disclosure. As shown in FIG. 4, the cabin monitoring and situation understanding perceiving method 200 is configured to monitor an inside vehicle cabin and perceive a situation understanding result 160 and includes a cabin interior image capturing step S11, an image adjusting step S12, a cabin interior monitoring step S13, a cabin exterior image and voice capturing step S14, a situation understanding model creating step S15 and a situation understanding perceiving step S16. The cabin interior image capturing step S11, the image adjusting step S12, the cabin exterior image and voice capturing step S14 and the situation understanding perceiving step S16 are the same as the steps corresponding to the cabin monitoring and situation understanding perceiving method 100 of the first embodiment, and will not be described again herein.

The cabin interior monitoring step S13 of the second embodiment includes a facial recognizing result 141 and a human pose estimating result 142 generated from a face recognizing step S131 and a human pose estimating step S132, which are the same as the face recognizing step S041 and the human pose estimating step S042. The difference from the first embodiment is that the cabin interior monitoring step S13 can further include a gesture analyzing step S133. The gesture analyzing step S133 is performed to drive the processing unit to analyze a gesture of the driver in the approximate image 130 to generate a gesture analyzing result 143. In detail, in response to determining that the driver or the passenger in the vehicle cabin shows a gesture to the aforementioned first camera unit, the first camera unit captures the cabin interior image 110 containing the gesture, and then the processing unit successively executes the image adjusting step S12 to adjust the cabin interior image 110 to the approximate image 130. It should be noted that the storage unit of the present disclosure has accessed a gesture database (not shown) containing the meanings represented by various gestures. Therefore, the processing unit generates the gesture analyzing result 143 by comparing the gesture database with the gesture in the approximate image 130.

Figure 5:
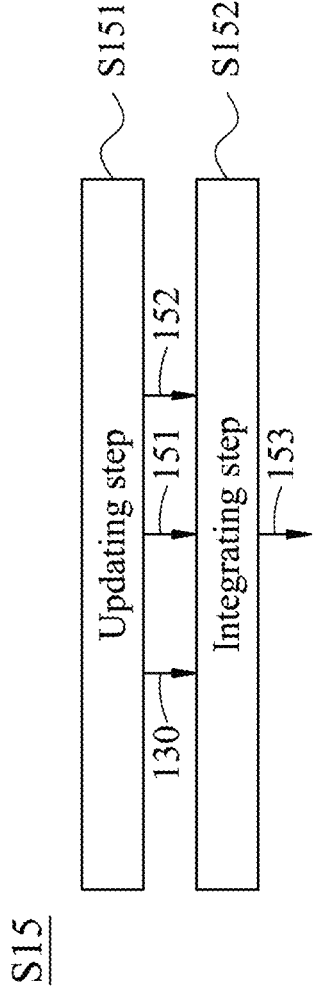
FIG. 5 shows a flow chart of a situation understanding model creating step of the cabin monitoring and situation understanding perceiving method of FIG. 4.

Please refer to FIG. 4 and FIG. 5. FIG. 5 shows a flow chart of the situation understanding model creating step S15 of the cabin monitoring and situation understanding perceiving method 200 of FIG. 4. As shown in FIG. 4 and FIG. 5, the situation understanding model creating step S15 is performed to drive the processing unit to train the approximate image 130, the cabin exterior image 151 and the voice information 152 to create a situation understanding model 153. In addition, the situation understanding model creating step S15 can include an updating step S151 and an integrating step S152. The updating step S151 is performed to drive the processing unit to continuously update the approximate image 130, the cabin exterior image 151 and the voice information 152 from the storage unit. The integrating step S152 is performed to drive the processing unit to integrate the approximate image 130, the cabin exterior image 151 and the voice information 152 having been updated according to a Convolutional Neural Network (CNN) and a Recurrent Neural Network (RNN) to generate the situation understanding model 153. In detail, the integrating step S152 is performed to integrate at least one of the gesture analyzing result 143 corresponding to the approximate image 130 having been updated and the voice information 152 having been updated, the approximate image 130 having been updated and the cabin exterior image 151 having been updated according to the CNN and the RNN to generate the situation understanding model 153. In the second embodiment, the RNN can be a Long Short-Term Memory (LSTM) model. The processing unit continuously updates the approximate image 130, the cabin exterior image 151 and the voice information 152 through multiple sensing to integrate the CNN and the LSTM model. The processing unit uses a software library (i.e., TensorFlow) and a network library (i.e., Keras) to pair and learn the characteristics of image information, natural language and gesture command, and finally creates the situation understanding model 153 that can realize the active human-machine interaction between the vehicle and the driver or the passenger. TensorFlow is an open source software library that is used for machine learning of various perception and language understanding tasks. Further, Keras is an open source neural network library written in Python that can be executed in TensorFlow. TensorFlow and Keras are prior arts and not the focus of the present disclosure, and will not be described again herein. In other embodiments, the situation understanding model can also be a Stacked Attention Networks (SAN), and the present disclosure is not limited thereto.

Figure 6:
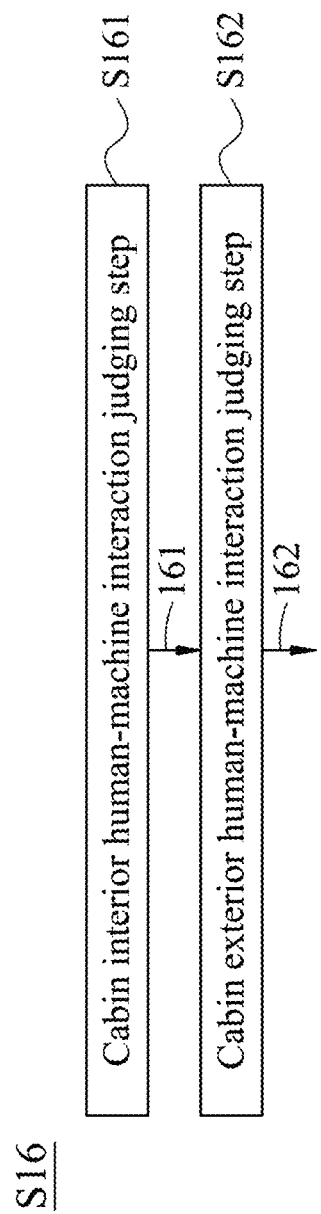
FIG. 6 shows a flow chart of a situation understanding perceiving step of the cabin monitoring and situation understanding perceiving method of FIG. 4.

Please refer to FIG. 4, FIG. 5 and FIG. 6. FIG. 6 shows a flow chart of the situation understanding perceiving step S16 of the cabin monitoring and situation understanding perceiving method 200 of FIG. 4. As shown in FIG. 4, FIG. 5 and FIG. 6, the situation understanding perceiving step S16 can include a cabin interior human-machine interaction judging step S161 and a cabin exterior human-machine interaction judging step S162. In particular, the cabin interior human-machine interaction judging step S161 is performed to drive the processing unit to process the gesture analyzing result 143 or the voice information 152 according to the situation understanding model 153, and then judge the approximate image 130 to generate the cabin interior judging result 161 of the human-machine interaction. The cabin exterior human-machine interaction judging step S162 is performed to drive the processing unit to process the gesture analyzing result 143 or the voice information 152 according to the situation understanding model 153, and then judge the cabin exterior image 151 to generate the cabin exterior judging result 162 of the human-machine interaction.

Figure 7:
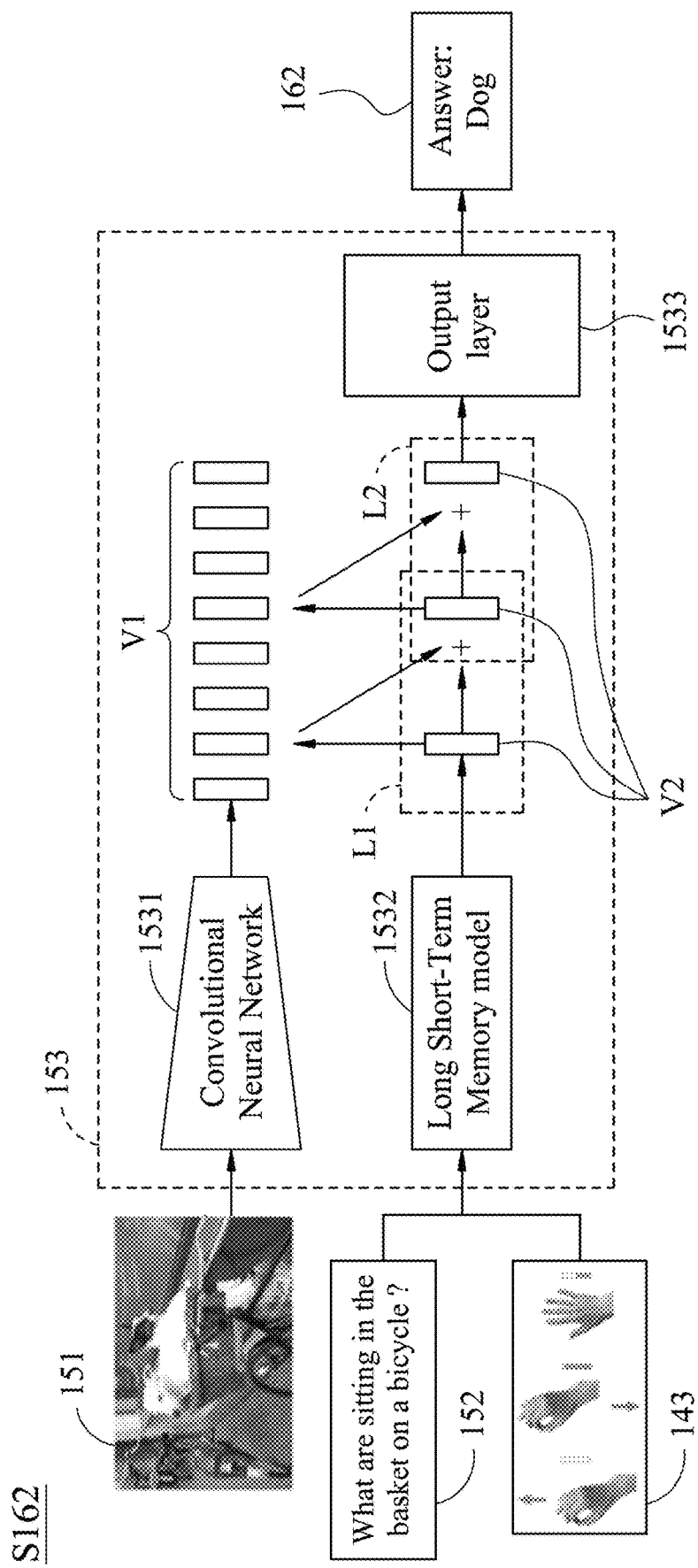
FIG. 7 shows a schematic view of a cabin exterior human-machine interaction judging step of FIG. 6.

FIG. 7 shows a schematic view of the cabin exterior human-machine interaction judging step S162 of FIG. 6. As shown in FIG. 7, the driver or the passenger asks "What are sitting in the basket on a bicycle?", and then the audio unit in the inside vehicle cabin captures a voice of the aforementioned question and generates the voice information 152; or, the driver or the passenger shows a gesture to the first camera unit, and then the processing unit executes the gesture analyzing step S133 and generates the gesture analyzing result 143. The second camera unit simultaneously captures the cabin exterior image 151 from the outside vehicle cabin. Subsequently, the processing unit imports the gesture analyzing result 143 or the voice information 152 into the situation understanding model 153, and imports the cabin exterior image 151 into the situation understanding model 153. The situation understanding model 153 extracts a feature vector V1 from the cabin exterior image 151 through a convolutional neural network 1531, and extracts a feature vector V2 from the gesture analyzing result 143 or the voice information 152 through a first attention mechanism layer L1 and a second attention mechanism layer L2 of a long short-term memory model 1532. The processing unit performs interactive feature learning on the feature vectors V1, V2. The processing unit uses an output layer 1533 to calculate an output of the long short-term memory model 1532, and judges the cabin exterior image 151 and then outputs "Answer: Dog" (i.e., the cabin exterior judging result 162). In addition, an activation function used by the output layer 1533 can be a Softmax function, a Sigmoid function or a ReLU function, but the present disclosure is not limited thereto.

Therefore, the cabin monitoring and situation understanding perceiving method 200 of the present disclosure performs feature learning on the approximate image 130, the cabin exterior image 151 and the voice information 152 to train the situation understanding model 153, and imports the cabin interior image 110, the cabin exterior image 151 and the voice information 152 of the driver and the passenger to the situation understanding model 153 so as to realize the active human-machine interactions of a voice question answering in the outside vehicle cabin and a question answering monitoring in the inside vehicle.

Figure 8:
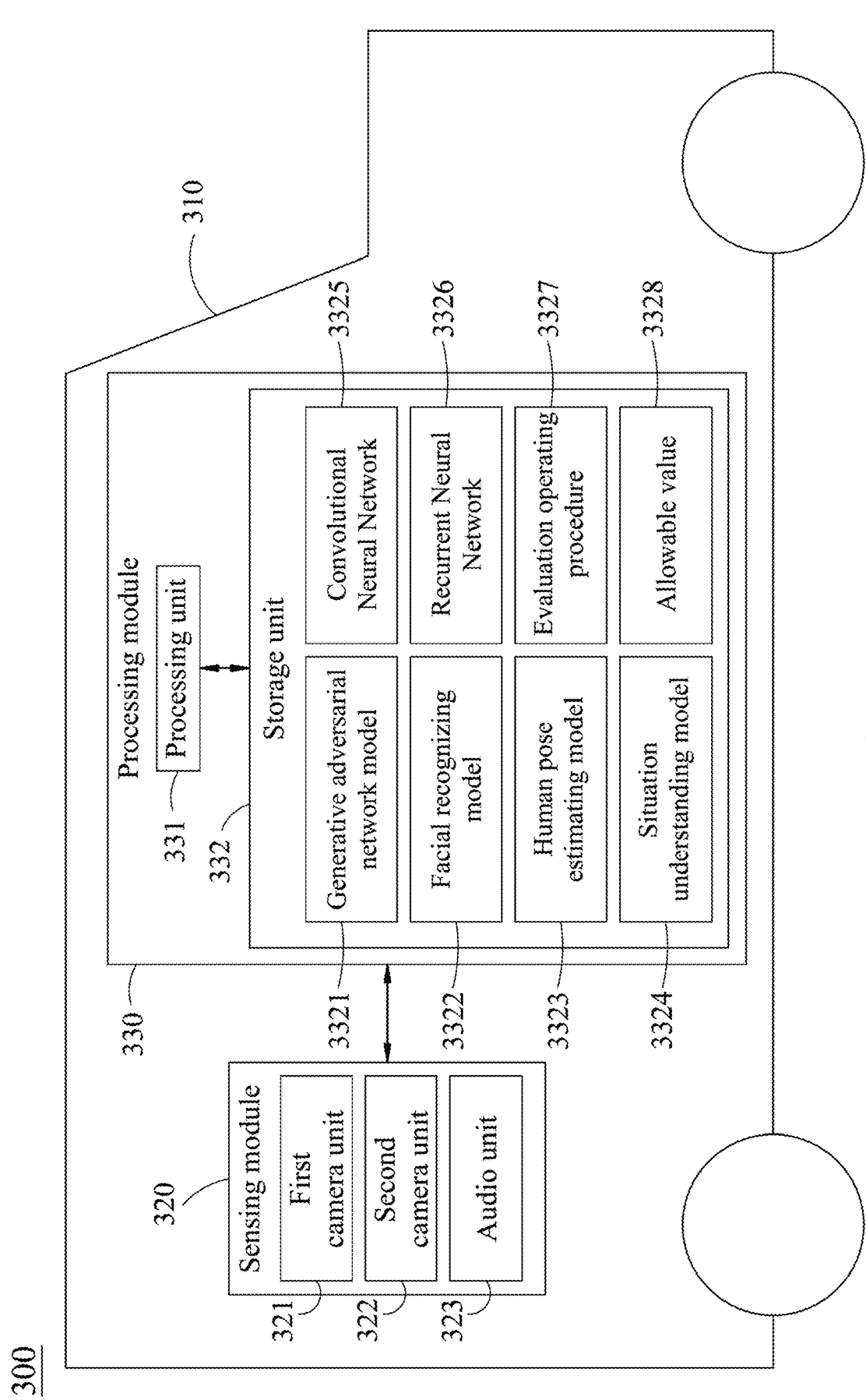
FIG. 8 shows a block diagram of a cabin monitoring and situation understanding perceiving system according to a third embodiment of the present disclosure.

Please refer to FIG. 1 to FIG. 8. FIG. 8 shows a block diagram of a cabin monitoring and situation understanding perceiving system 300 according to a third embodiment of the present disclosure. As shown in FIG. 8, the cabin monitoring and situation understanding perceiving system 300 is configured to monitor an inside vehicle cabin and perceive a situation understanding result 160. The cabin monitoring and situation understanding perceiving system 300 includes a vehicle 310, a sensing module 320 and a processing module 330. The sensing module 320 and the processing module 330 are disposed on the vehicle 310, and the sensing module 320 includes a first camera unit 321, a second camera unit 322 and an audio unit 323. The processing module 330 is electrically connected to the sensing module 320 and includes a processing unit 331 and a storage unit 332.

The storage unit 332 is configured to access a generative adversarial network model 3321, a facial recognizing model 3322, a human pose estimating model 3323, a situation understanding model 3324, a convolutional neural network 3325, a recurrent neural network 3326, an evaluation operating procedure 3327 and an allowable value 3328. The first camera unit 321 is electrically connected to the storage unit 332. The first camera unit 321 captures a cabin interior image 110 from the inside vehicle cabin and stores the cabin interior image 110 to the storage unit 332. The second camera unit 322 is electrically connected to the storage unit 332. The second camera unit 322 captures a cabin exterior image 151 from the outside vehicle cabin and stores the cabin exterior image 151 to the storage unit 332. The audio unit 323 is electrically connected to the storage unit 332. The audio unit 323 captures a voice information 152 from the inside vehicle cabin and stores the voice information 152 to the storage unit 332. The processing unit 331 is electrically connected to the storage unit 332 and configured to implement the cabin monitoring and situation understanding perceiving methods 100, 200. The processing unit 331 can be a Digital Signal Processor (DSP), a Micro Processing Unit (MPU), a Central Processing Unit (CPU) or other electronic processors, but the present disclosure is not limited thereto. Therefore, the cabin monitoring and situation understanding perceiving system 300 of the present disclosure uses the first camera unit 321 and the second camera unit 322 to capture the cabin interior image 110 and the cabin exterior image 151, respectively, and imports the cabin interior image 110 and the cabin exterior image 151 with the voice information 152 into the situation understanding model 3324 for calculating and processing to perceive the situation understanding result 160, thereby realizing monitoring capabilities under Wide-Field of View (WFoV), and continuously and actively updating the aforementioned information to achieve more accurate and customized human-machine interaction function.

In summary, the present disclosure has the following advantages. First, the scene analysis inside and outside the vehicle cabin and the improvement of the safety are realized. Second, the generative adversarial network model is used for adjusting the cabin interior image to the normal exposure value, thereby ensuring that the situation understanding result perceived subsequently has a high accuracy rate. Third, the cabin interior image, the cabin exterior image and the voice information of the driver and the passenger are imported to the situation understanding model so as to realize the active human-machine interactions of the voice question answering in the outside vehicle cabin and the question answering monitoring in the inside vehicle.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A cabin monitoring and situation understanding perceiving method, which is configured to monitor an inside vehicle cabin and perceive a situation understanding result, the cabin monitoring and situation understanding perceiving method comprising:
   performing a cabin interior image capturing step to drive a first camera unit to capture a cabin interior image from the inside vehicle cabin and store the cabin interior image to a storage unit, wherein the cabin interior image comprises an overexposed image, a normally exposed image and an underexposed image;
   performing a generative adversarial network model creating step to drive a processing unit to create a generative adversarial network model according to the overexposed image, the normally exposed image and the underexposed image of the cabin interior image from the storage unit;
   performing an image adjusting step to drive the processing unit to adjust the cabin interior image according to the generative adversarial network model to generate an approximate image approximating the normally exposed image;
   performing a cabin interior monitoring step to drive the processing unit to process the approximate image according to a facial recognizing model and a human pose estimating model to generate a facial recognizing result and a human pose estimating result;
   performing a cabin exterior image and voice capturing step to drive a second camera unit to capture a cabin exterior image and store the cabin exterior image to the storage unit, and drive an audio unit to capture a voice information from the inside vehicle cabin and store the voice information to the storage unit; and
   performing a situation understanding perceiving step to drive the processing unit to process at least one of the approximate image, the cabin exterior image and the voice information according to a situation understanding model to perceive the situation understanding result;
   wherein the storage unit accesses an allowable value, and the image adjusting step comprises:
      performing a luminosity confirming step to drive the processing unit to perform an evaluation operating procedure on the approximate image and the normally exposed image, wherein the evaluation operating procedure confirms whether a luminosity difference between the approximate image and the normally exposed image is within the allowable value.

2. The cabin monitoring and situation understanding perceiving method of claim 1, wherein the generative adversarial network model creating step comprises:
   performing an overexposed discriminator creating step to drive the processing unit to create an overexposed discriminator according to the overexposed image; and
   performing an underexposed discriminator creating step to drive the processing unit to create an underexposed discriminator according to the underexposed image;
   wherein the generative adversarial network model is composed of a generator, the overexposed discriminator and the underexposed discriminator.

3. The cabin monitoring and situation understanding perceiving method of claim 2, wherein the image adjusting step further comprises:
   performing a fused image generating step to drive the processing unit to input the overexposed image and the underexposed image to the generator to generate a fused image;
   performing a luminosity comparing step to drive the processing unit to compare the fused image with the underexposed image to generate a first luminosity difference and input the first luminosity difference to the overexposed discriminator, and compare the fused image with the overexposed image to generate a second luminosity difference and input the second luminosity difference to the underexposed discriminator;
   performing an adversarial result generating step to drive the overexposed discriminator to output a first adversarial result to the generator according to the first luminosity difference and the overexposed image, and drive the underexposed discriminator to output a second adversarial result to the generator according to the second luminosity difference and the underexposed image; and
   performing a luminosity approximating step to drive the generator to adjust the cabin interior image according to the first adversarial result and the second adversarial result to generate the approximate image approximating the normally exposed image.

4. The cabin monitoring situation understanding perceiving method of claim 3, wherein in response to determining that the luminosity difference is within the allowable value, the cabin interior monitoring step is successively performed;

wherein in response to determining that the luminosity difference is not within the allowable value, the processing unit updates the generator according to the first adversarial result and the second adversarial result.

5. The cabin monitoring and situation understanding perceiving method of claim 1, wherein the cabin interior monitoring step comprises:

performing a face recognizing step to drive the processing unit to extract a plurality of facial landmarks and a plurality of head angle points from the approximate image according to the facial recognizing model and calculate the facial landmarks and the head angle points to generate the facial recognizing result; and performing a human pose estimating step to drive the processing unit to estimate a human skeleton from the approximate image according to the human pose estimating model and calculate the human skeleton to generate the human pose estimating result.

6. A cabin monitoring and situation understanding perceiving method, which is configured to monitor an inside vehicle cabin and perceive a situation understanding result, the cabin monitoring and situation understanding perceiving method comprising:

performing a cabin interior image capturing step to drive a first camera unit to capture a cabin interior image from the inside vehicle cabin and store the cabin interior image to a storage unit, wherein the cabin interior image comprises a normally exposed image;

performing an image adjusting step to drive a processing unit to adjust the cabin interior image in the storage unit according to a generative adversarial network model to generate an approximate image approximating the normally exposed image;

performing a cabin interior monitoring step to drive the processing unit to process the approximate image according to a facial recognizing model and a human pose estimating model to generate a facial recognizing result and a human pose estimating result;

performing a cabin exterior image and voice capturing step to drive a second camera unit to capture a cabin exterior image and store the cabin exterior image to the storage unit, and drive an audio unit to capture a voice information from the inside vehicle cabin and store the voice information to the storage unit;

performing a situation understanding model creating step to drive the processing unit to train the approximate image, the cabin exterior image and the voice information to create a situation understanding model; and performing a situation understanding perceiving step to drive the processing unit to process at least one of the approximate image, the cabin exterior image and the voice information according to the situation understanding model to perceive the situation understanding result;

wherein the storage unit accesses an allowable value, and the image adjusting step comprises:

performing a luminosity confirming step to drive the processing unit to perform an evaluation operating procedure on the approximate image and the normally exposed image, wherein the evaluation operating procedure confirms whether a luminosity difference between the approximate image and the normally exposed image is within the allowable value.

7. The cabin monitoring and situation understanding perceiving method of claim 6, wherein the situation understanding model creating step comprises:

performing an updating step to drive the processing unit to continuously update the approximate image, the cabin exterior image and the voice information from the storage unit; and performing an integrating step to drive the processing unit to integrate the approximate image, the cabin exterior image and the voice information having been updated according to a convolutional neural network and a recurrent neural network to generate the situation understanding model.

8. The cabin monitoring and situation understanding perceiving method of claim 7, wherein the cabin interior monitoring step comprises:

performing a gesture analyzing step to drive the processing unit to analyze a gesture of a driver in the approximate image to generate a gesture analyzing result;

wherein the integrating step is performed to integrate one of the gesture analyzing result and the voice information, the approximate image and the cabin exterior image having been updated according to the convolutional neural network and the recurrent neural network to generate the situation understanding model.

9. The cabin monitoring and situation understanding perceiving method of claim 8, wherein the situation understanding result comprises at least one of a cabin interior judging result and a cabin exterior judging result, and the situation understanding perceiving step comprises:

performing a cabin interior human-machine interaction judging step to drive the processing unit to process the gesture analyzing result or the voice information according to the situation understanding model, and then judge the approximate image to generate the cabin interior judging result of a human-machine interaction; and performing a cabin exterior human-machine interaction judging step to drive the processing unit to process the gesture analyzing result or the voice information according to the situation understanding model, and then judge the cabin exterior image to generate the cabin exterior judging result of the human-machine interaction.

10. A cabin monitoring and situation understanding perceiving system, which is configured to monitor an inside vehicle cabin and perceive a situation understanding result, the cabin monitoring and situation understanding perceiving system comprising:

a storage unit configured to access a generative adversarial network model, a facial recognizing model, a human pose estimating model, a situation understanding model and an allowable value;

a first camera unit connected to the storage unit, wherein the first camera unit captures a cabin interior image from the inside vehicle cabin and stores the cabin interior image to the storage unit, and the cabin interior image comprises a normally exposed image;

a second camera unit connected to the storage unit, wherein the second camera unit captures a cabin exterior image and stores the cabin exterior image to the storage unit;

an audio unit connected to the storage unit, wherein the audio unit captures a voice information from the inside vehicle cabin and stores the voice information to the storage unit; and a processing unit connected to the storage unit, wherein the processing unit is configured to implement a cabin monitoring and situation understanding perceiving method comprising:
  performing an image adjusting step to adjust the cabin interior image according to the generative adversarial network model to generate an approximate image approximating the normally exposed image;
  performing a cabin interior monitoring step to process the approximate image according to the facial recognizing model and the human pose estimating model to generate a facial recognizing result and a human pose estimating result; and
  performing a situation understanding perceiving step to process at least one of the approximate image, the cabin exterior image and the voice information according to the situation understanding model to perceive the situation understanding result;
  wherein the image adjusting step comprises:
    performing a luminosity confirming step to drive the processing unit to perform an evaluation operating procedure on the approximate image and the normally exposed image, wherein the evaluation operating procedure confirms whether a luminosity difference between the approximate image and the normally exposed image is within the allowable value.

11. The cabin monitoring and situation understanding perceiving system of claim 10, wherein the cabin interior image further comprises an overexposed image and an underexposed image, and the cabin monitoring and situation understanding perceiving method further comprises:
  performing a generative adversarial network model creating step to drive the processing unit to create the generative adversarial network model according to the overexposed image, the normally exposed image and the underexposed image of the cabin interior image from the storage unit.

12. The cabin monitoring and situation understanding perceiving system of claim 11, wherein the generative adversarial network model creating step comprises:
  performing an overexposed discriminator creating step to drive the processing unit to create an overexposed discriminator according to the overexposed image; and
  performing an underexposed discriminator creating step to drive the processing unit to create an underexposed discriminator according to the underexposed image;
  wherein the generative adversarial network model is composed of a generator, the overexposed discriminator and the underexposed discriminator.

13. The cabin monitoring and situation understanding perceiving system of claim 12, wherein the image adjusting step comprises:
  performing a fused image generating step to drive the processing unit to input the overexposed image and the underexposed image to the generator to generate a fused image;
  performing a luminosity comparing step to drive the processing unit to compare the fused image with the underexposed image to generate a first luminosity difference and input the first luminosity difference to the overexposed discriminator, and compare the fused image with the overexposed image to generate a second luminosity difference and input the second luminosity difference to the underexposed discriminator;
  performing an adversarial result generating step to drive the overexposed discriminator to output a first adversarial result to the generator according to the first luminosity difference and the overexposed image, and drive the underexposed discriminator to output a second adversarial result to the generator according to the second luminosity difference and the underexposed image; and
  performing a luminosity approximating step to drive the generator to adjust the cabin interior image according to the first adversarial result and the second adversarial result to generate the approximate image approximating the normally exposed image.

14. The cabin monitoring and situation understanding perceiving system of claim 13,
  wherein in response to determining that the luminosity difference is within the allowable value, the cabin interior monitoring step is successively performed;
  wherein in response to determining that the luminosity difference is not within the allowable value, the processing unit updates the generator according to the first adversarial result and the second adversarial result.

15. The cabin monitoring and situation understanding perceiving system of claim 10, wherein the cabin interior monitoring step comprises:
  performing a face recognizing step to drive the processing unit to extract a plurality of facial landmarks and a plurality of head angle points from the approximate image according to the facial recognizing model and calculate the facial landmarks and the head angle points to generate the facial recognizing result; and
  performing a human pose estimating step to drive the processing unit to estimate a human skeleton from the approximate image according to the human pose estimating model and calculate the human skeleton to generate the human pose estimating result.

16. The cabin monitoring and situation understanding perceiving system of claim 10, wherein the cabin monitoring and situation understanding perceiving method further comprises:
  performing a situation understanding model creating step to drive the processing unit to train the approximate image, the cabin exterior image and the voice information to create the situation understanding model.

17. The cabin monitoring and situation understanding perceiving system of claim 16, wherein the storage unit accesses a convolutional neural network and a recurrent neural network, and the situation understanding model creating step comprises:
  performing an updating step to drive the processing unit to continuously update the approximate image, the cabin exterior image and the voice information from the storage unit; and
  performing an integrating step to drive the processing unit to integrate the approximate image, the cabin exterior image and the voice information having been updated according to the convolutional neural network and the recurrent neural network to generate the situation understanding model.

18. The cabin monitoring and situation understanding perceiving system of claim 17, wherein the cabin interior monitoring step comprises:
  performing a gesture analyzing step to drive the processing unit to analyze a gesture of a driver in the approximate image to generate a gesture analyzing result;
  wherein the integrating step is performed to integrate one of the gesture analyzing result and the voice information, the approximate image and the cabin exterior image having been updated according to the convolutional neural network and the recurrent neural network to generate the situation understanding model.

19. The cabin monitoring and situation understanding perceiving system of claim 18, wherein the situation understanding result comprises at least one of a cabin interior judging result and a cabin exterior judging result, and the situation understanding perceiving step comprises:

performing a cabin interior human-machine interaction judging step to drive the processing unit to process the gesture analyzing result or the voice information according to the situation understanding model, and then judge the approximate image to generate the cabin interior judging result of a human-machine interaction; and performing a cabin exterior human-machine interaction judging step to drive the processing unit to process the gesture analyzing result or the voice information according to the situation understanding model, and then judge the cabin exterior image to generate the cabin exterior judging result of the human-machine interaction.

* * * * *